United States Patent
Bhoge et al.

(10) Patent No.: US 11,259,525 B2
(45) Date of Patent: Mar. 1, 2022

(54) STABLE HERBICIDAL COMPOSITIONS

(71) Applicant: UPL LIMITED, Haldia (IN)

(72) Inventors: Satish Ekanath Bhoge, Mumbai (IN);
Paresh Vithaldas Talati, Mumbai (IN);
Jaidev Rajnikant Shroff, Dubai (AE);
Vikram Rajnikant Shroff, Dubai (AE)

(73) Assignee: UPL LIMITED, Haldia (IN)

( * ) Notice: Subject to any disclaimer, the term of this patent is extended or adjusted under 35 U.S.C. 154(b) by 0 days.

(21) Appl. No.: 16/344,892

(22) PCT Filed: Oct. 25, 2017

(86) PCT No.: PCT/IB2017/056311
§ 371 (c)(1),
(2) Date: Apr. 25, 2019

(87) PCT Pub. No.: WO2018/078478
PCT Pub. Date: May 3, 2018

(65) Prior Publication Data
US 2019/0261631 A1 Aug. 29, 2019

(30) Foreign Application Priority Data

Oct. 25, 2016 (IN) .............................. 201631036553

(51) Int. Cl.
| | | |
|---|---|---|
| *A01N 25/04* | (2006.01) | |
| *A01N 25/30* | (2006.01) | |
| *A01N 33/22* | (2006.01) | |
| *A01N 37/22* | (2006.01) | |
| *A01N 43/40* | (2006.01) | |
| *A01N 57/20* | (2006.01) | |

(52) U.S. Cl.
CPC ............. *A01N 57/20* (2013.01); *A01N 25/04* (2013.01); *A01N 25/30* (2013.01); *A01N 33/22* (2013.01); *A01N 37/22* (2013.01); *A01N 43/40* (2013.01)

(58) Field of Classification Search
CPC ........ A01N 57/20; A01N 25/04; A01N 25/30; A01N 33/22; A01N 37/22; A01N 43/40
See application file for complete search history.

(56) References Cited

U.S. PATENT DOCUMENTS

| | | | | |
|---|---|---|---|---|
| 4,853,026 A | * | 8/1989 | Frisch ..................... | A01N 25/04 504/127 |
| 5,308,827 A | | 5/1994 | Sakamoto et al. | |
| 7,407,913 B2 | * | 8/2008 | Lee ......................... | A01N 57/20 504/127 |
| 8,815,773 B2 | | 8/2014 | Shroff et al. | |
| 2005/0266998 A1 | | 12/2005 | Frisch et al. | |
| 2006/0148648 A1 | * | 7/2006 | Crockett ................ | A01N 57/20 504/128 |

FOREIGN PATENT DOCUMENTS

| | | | | |
|---|---|---|---|---|
| CA | 2856056 A1 | * | 5/2013 | ............. C08K 5/101 |
| CN | 103053610 A | | 4/2013 | |
| DE | WO1992011345 A1 | * | 7/1992 | |
| EP | 1209970 B1 | | 11/2003 | |
| JP | 08333204 A | | 12/1996 | |
| WO | 2015091472 A1 | | 6/2015 | |
| WO | 2016097178 A1 | | 6/2016 | |

OTHER PUBLICATIONS

McClintock, B. Proceedings of the National Academy of Sciences, Jun. 1950, 36 (6) 344-355 (Year: 1950).*
Tang, et al. Journal of Colloid and Interface Science 325 (2008) 223-227 (Year: 2008).*
Wermuth, C. Drug Discovery Today, vol. 11, Nos. 7/8, Apr. 2006, 348-354 (Year: 2006).*
Brausch, J. and Smith, P. Arch. Environ. Contam. Toxicol. 52, 217-221 (2007) (Year: 2007).*
Ye et al. J Environ Sci (China). 2002;14(4):524-529 (Year: 2002).*
Merriam-Webster [online] Apr. 25, 2009 [retrieved on Aug. 10, 2020], Retrieved from the internet:<https://web.archive.org/web/20090425140703/https://www.merriam-webster.com/dictionary/derivative> (Year: 2009).*
FINALE Bayer Environmental Science, Material Safety Data Sheet, Dec. 9, 2002 [retrieved on Mar. 30, 2021]. Retrieved from the Internet <URL: https://sfforest.files.wordpress.com/2017/11/finale_msds.pdf (Year: 2002).*
Rivard, L. (Environmental Fate of Metolachlor, Apr. 2003, [retrieved on Mar. 30, 2021]. Retrieved from the Internet <URL: http://citeseerx.ist.psu.edu/viewdoc/download?doi=10.1.1.450.1763&rep=rep1&type=pdf (Year: 2003).*
Wibawa et al. African Journal of Agricultural Research vol. 5(16), pp. 2097-2102, Aug. 18, 2010 (Year: 2010).*
International Search Report and Written Opinion; International Application No. PCT/IB2017/056311; International Filing Date Oct. 12, 2017; dated Dec. 19, 2017; 11 pages.

\* cited by examiner

*Primary Examiner* — Alton N Pryor
(74) *Attorney, Agent, or Firm* — Cantor Colburn LLP

(57) ABSTRACT

The present invention provide stable agrochemical compositions comprising 2-amino-4-[hydroxy(methyl)phosphinoyl]butyric acid (glufosinate), an organosilicone adjuvant, a nonionic surfactant and optionally one or more other active ingredients. A process for the preparation of such compositions and their use in controlling weeds are also provided.

12 Claims, No Drawings

STABLE HERBICIDAL COMPOSITIONS

CROSS REFERENCE TO RELATED APPLICATIONS

This application is a National Stage application of PCT/IB2017/056311, filed on Oct. 12, 2017, which claims the benefit of Indian Application No. 201631036553, filed Oct. 25, 2016, both of which are incorporated by reference in their entirety herein.

TECHNICAL FIELD OF THE INVENTION

The present invention relates to stable agrochemical compositions. The present invention provides stable agrochemical compositions comprising 2-amino-4-[hydroxy(methyl)phosphinoyl]butyric acid (glufosinate), an organosilicone adjuvant, a nonionic surfactant and optionally one or more other active ingredients. A process for the preparation of such compositions and their use in controlling weeds are also provided.

BACKGROUND OF THE INVENTION

Pesticides are used widely to manage agricultural pests. Due to the widespread usage, there is always a demand to bring up methods to increase the efficacy of pesticides. One common practice to increase the activity of an active ingredient is to combine it with one or more other active ingredients having desired activity profile. Such combinations can lead to highly effective synergistic products having a broad spectrum coverage which may also enable lowering of application rate of active ingredients. Accordingly, today's agrochemical practice prefers combination products of active ingredients having desired activity profiles.

On the other hand, suitable adjuvants can be used to enhance performance of active ingredients and/or physical properties of the formulation. Usually the active ingredients are formulated with various formulation auxiliaries to enhance their activity.

Agrochemical formulations can be formulated in various ways primarily based on physical and chemical characteristics of the active ingredients. Some of such type of formulations are aqueous solutions, emulsifiable concentrates, encapsulated suspensions, wettable powders, oil-in-water or water-in-oil emulsions, suspo-emulsions, suspo-solutions, micro emulsions, emulsions, ZC formulations and granules.

When a water soluble active ingredient is combined with a water insoluble ingredient the choices of formulation type remain limited. Moreover, additional care has to be taken when water insoluble ingredient also is required to be incorporated in the formulation.

Emulsions, emulsifiable concentrates, microemusions and suspoemulsions are preferred type of agrochemical formulation when water soluble active ingredients are combined with water insoluble active ingredients or water insoluble surfactants/adjuvants.

Adjuvants and surfactants are added to pesticidal compositions to provide necessary wetting and spreading properties. The surfactants of choice include hydrophobic alkylphenol polyethoxylates, polyethoxylated alkylphenol sulfate, polyethoxylated alkyl phenol phosphate, polyethoxylated alkylaryl phosphate, polyethoxylated alkylaryl sulfate, polyethoxylated fatty alcohols or fatty amines, amine oxides, alkanesulfonates or alkylbenzenesulfonates and lignin sulfonates. Emulsifiers such as calcium salts of alkylarylsulfonic acids, such as calcium dodecylbenzene sulfonate, or nonionic emulsifiers such as fatty acid polyglycol esters, alkylaryl polyglycol ethers, fatty alcohol polyglycol ethers, propylene oxide/ethylene oxide condensates and alkyl polyethers are frequently employed in agrochemical formulations.

Another class of adjuvants are organosilicone adjuvants which are added to the pesticide composition to impart spreading and wetting properties. Organosilicone surfactants are generally used to increase the spray coverage area and thereby increasing the availability of the herbicide on leaf surface. Incorporation of water insoluble organosilicone adjuvants in formulations of water soluble active ingredients is a challenge.

Glufosinate is a non-selective foliage application type contact herbicide which kills or controls many species of weeds. Generally glufosinate is used in the form of its water soluble ammonium salt. In The Pesticide Manual 15th Edition, glufosinate has been described as being widely used in burn-down segments, and for control of a wide range of broad-leaved weeds and grasses and sedges in cereals, cotton, corn and soy, fruit orchards, vineyards, rubber and oil palm plantations, ornamental trees and bushes, non-crop land, and pre-emergence in vegetables.

Glufosinate being a water soluble active ingredient, it is preferably formulated as aqueous solutions along with incorporation of water soluble ingredients/adjuvants. While water insoluble active ingredients/adjuvants are to be combined with glufosinate, physical and chemical stability of the formulation needs to be taken care of.

U.S. Pat. No. 7,105,470 discloses synergistic combination of glufosinate, with one or more different herbicides selected from foliar- and/or soil-acting herbicides which are effective selectively in soybeans. The patent suggest the possible different types of formulation in general and demonstrates that known formulation auxiliaries required, such as inert materials, surfactants, solvents and other additives can be used for making such formulations.

Compositions of glufosinate with water insoluble active ingredients often lead to instability of the formulation. These compositions on storage especially under various temperature conditions lead to creaming/oil layer separation and sedimentation. The problem is aggravated when glufosinate is formulated with a water insoluble active ingredient along with a water insoluble adjuvant such as organosilicone adjuvant.

Hence there is a need to develop compositions of glufosinate, which is bioefficacious and stable under varied climatic conditions.

Inventors of the present invention have surprisingly found that stable compositions of glufosinate can be obtained when an organosilicone adjuvant is combined with a nonionic surfactant. The compositions of the present invention lead to an unexpected faster desiccation of undesired vegetation using the combination of organosilicone adjuvant and a non-ionic surfactant with glufosinate.

OBJECT OF THE INVENTION

It is an object of the present invention to provide a stable composition comprising glufosinate which is stable at various temperature conditions.

It is another object of the present invention to provide a stable composition comprising glufosinate which exhibits effective weed control.

It is another object of the present invention to provide a stable composition comprising glufosinate which lead to faster desiccation of undesired vegetation.

It is another object of the present invention to provide a stable composition comprising glufosinate and a water insoluble active ingredient which is stable at various temperature conditions.

It is another object of the present invention to provide a stable composition comprising glufosinate and one or more other active ingredients which exhibits effective weed control.

SUMMARY OF THE INVENTION

The present invention provides a stable composition comprising glufosinate, an organosilicone adjuvant and a non-ionic surfactant.

The present invention further provides a stable composition comprising glufosinate, an organosilicone adjuvant, a non-ionic surfactant and a second active ingredient. The present invention further provides a stable composition comprising glufosinate, an organosilicone adjuvant, a non-ionic surfactant and one or more other active ingredients.

The present invention provides a stable composition comprising glufosinate, an organosilicone adjuvant, a non-ionic surfactant and an anionic surfactant.

The present invention provides a method of weed control comprising applying to the plants a stable composition comprising glufosinate, an organosilicone adjuvant and a non-ionic surfactant.

The present invention further provides a method of weed control comprising applying to the plants a stable composition comprising glufosinate, an organosilicone adjuvant, a non-ionic surfactant and one or more other active ingredients.

DETAILED DESCRIPTION

Surprisingly it has now been found that a stable composition can be developed by the combination of glufosinate, an organosilicone adjuvant and a non-ionic surfactant. Unexpectedly, it has been observed that faster developing symptoms such as yellowing and desiccation of weeds, as well as overall bioefficacy can be achieved by using compositions of the present invention. It was more surprisingly found that the stability of the composition of the present invention was adversely affected when the non-ionic surfactant component was absent, even in the presence of the organosilicone adjuvant and another cationic and/or anionic surfactant.

Accordingly, the present invention provides stable composition comprising glufosinate, an organosilicone adjuvant a non-ionic surfactant. The compositions are particularly stable at various temperature conditions.

The present invention further provides stable compositions comprising glufosinate, an organosilicone adjuvant, a non-ionic surfactant and an anionic surfactant.

The present invention further provides stable compositions comprising glufosinate, an organosilicone adjuvant, a non-ionic surfactant and a second active ingredient.

Further, the present invention provides stable compositions comprising glufosinate, an organosilicone adjuvant, a non-ionic surfactant and one or more other active ingredients.

The compositions of the present invention can be formulated as homogenous or heterogeneous system. In principle, the compositions of the present invention result in a heterogeneous dispersion system which contain a heterogeneous dispersed phase and a continuous phase. Preferably, the compositions contains oil or solid particles dispersed in a continuous phase. Examples of such compositions include oil-in water emulsion, water-in-oil emulsion, suspo emulsions, microemulsions and suspo solutions.

In certain preferred embodiments of the present invention, the compositions are formulated as oil-in-water emulsions.

The present invention provides stable emulsion compositions comprising glufosinate, an organosilicone adjuvant, a non-ionic surfactant.

The present invention further provides stable emulsion compositions comprising glufosinate, an organosilicone adjuvant, a non-ionic surfactant and one or more other active ingredients which are stable at various temperature conditions.

The stable emulsion compositions according to the present invention further comprises an anionic surfactant.

With respect to the present invention, the phrase "stable composition" as used herein is intended to refer to a composition which is stable under varied temperature conditions such as accelerated storage conditions and under low temperature conditions or wherein the composition satisfy the stability parameters such as creaming and sedimentation within the prescribed limits or a composition wherein no settling of particle or phase separation is observed when exposed to various temperature conditions.

The phrase "stable composition" further refers to stability over a long term of storage.

With respect to the present invention, the phrase "accelerated storage conditions" as used herein is intended to refer to a storage condition wherein the compositions are kept at a temperature of 54±2° C. for 14 days.

With respect to the present invention, the phrase "low temperature" as used herein is intended to refer to a temperature below 10° C., preferably below 5° C., more preferably below 0° C., and most preferably it is −5°.

Glufosinate is used in the form of its salts, its isomers, mixture of isomers, derivatives, or their lower alkyl esters thereof or salts thereof with acids or bases.

According to an embodiment of the present invention glufosinate is selected from its lower alkyl esters thereof or salts thereof with acids or bases such as its hydrochloride, monosodium salt, disodium salt, monopotassium salt, dipotassium salt, monocalcium salt, ammonium salt, —NH3 (CH3)+ salt, —NH2(CH3)2+ salt, —NH(CH3)3+ salt, —NH(CH3)2(C2H4OH)+, —NH2(CH3)(C2H4OH)+, or its methyl ester, ethyl ester, propyl ester or butyl ester.

In another embodiment of the present invention the composition comprises a water soluble inorganic salt of glufosinate preferably ammonium salt of glufosinate.

In another embodiment, glufosinate-P is the preferred isomer.

In certain embodiments of the present invention the composition comprises from about 1% to about 60% by weight of glufosinate. Preferably it is present in an amount from about 5% to about 50% by weight of the composition.

In an embodiment the organosilicone adjuvants of present invention comprises organomodified siloxanes.

In another embodiment, the organosilicone adjuvant is an organomodified trisiloxane selected from alkyl-modified trisiloxanes, alkoxylated trisiloxanes, polyalkyleneoxide-modified trisiloxanes and silane dichlorodimethyl—hydrolysis product with silica, silane hexadecyltrimethoxy—hydrolysis product with silica. Examples of such adjuvants include but are not limited to Silwet 408, Silwet L 408, Silwet 608, Dow Corning 5212; Qwikwet 357; Resicare MSW, Silsurf A 008UP, Siltech Ag 64; Silwet REACH; Tech 408, Xiameter OFX5211, Silgourd 9, Aerosil R816 and Aerosil R974.

In another embodiment the composition comprises from about 0.1% to about 5% by weight of the organosilicone adjuvants.

In an embodiment the composition according to the present invention comprises at least one nonionic surfactant.

In yet another embodiment of the present invention the composition comprises from about 0.1% to about 25% by weight of the nonionic surfactant.

Examples of the nonionic surfactant include polyethylene glycol ester of fatty acids, polyalkylene glycol monobutyl ether, tristyryl phenol alkoxylate and alcohol alkoxylates.

In another embodiment of the present invention the fatty acids may be selected from saturated or unsaturated fatty acids having 8-22 carbon atoms.

The preferred fatty acid components of polyethylene glycol ester of fatty acid include capric acid, lauric acid, tridecylic acid, pentadecylic acid, myristic acid, stearic acid, dihydroxystearic acid, palmitic acid, oleic acid, ricinoleic acid, linoleic acid, linolenic acid, and mixture thereof. Polyethylene glycol ester of fatty acid contain ethylene oxide unit ranging from 1 to 80, preferably 1 to 60.

In certain embodiments of the present invention the polyalkylene glycol monobutyl ether contains $C_1$-$C_{15}$ alkylene oxide units.

Certain embodiments of the present invention comprise tristyryl phenol alkoxylate as the nonionic surfactant preferably tristyryl phenol ethoxylate.

In another embodiment of the present invention the nonionic surfactant is a $C_1$-$C_{25}$ alkyl alcohol alkoxylate.

Specific examples of nonionic surfactants include but are not limited to Soprophor BSU, Lutensol T05, Lutensol AO, Synperonic A-7, Synperonic A-11, Tergitol XD, Emulsogen TS series, Alkamul VO/2003, Alkamul A, Alkamul AP, Tergitol 15-S-7, Tergitol 15-S-3, Rhodasuf 860P and ADSEE 900.

In an embodiment of the present invention the composition comprises a mixture of two or more nonionic surfactants.

In an embodiment the compositions according to the present invention comprise at least one anionic surfactant.

In an embodiment of the present invention the composition comprises from about 0.1% to about 25% by weight of the anionic surfactant.

Examples of the anionic surfactant includes anionic derivatives of fatty alcohols having 10-24 carbon atoms in the form of ether carboxylates, sulphonates, sulfates, and phosphates; derivatives of alkyl aryl phenols such as tristrylphenol phosphates and sulphates; and linear alkyl benzene sulphonate and derivatives of dicarboxylic acid in the form of dicarboxylic ester sulfonate such as alkyl sulfosuccinate.

The anionic surfactant is preferably selected from salts of tristyrylphenol ether phosphate and tristyrylphenol ether sulfate. Specific examples of such surfactants are selected from but not limited to Rhodafac RS 710, Rhodafac PA/19, Soprophor 3D33, Stepfac TSP PE-N, Soprophore 4D384 and Soprophore FL.

In another embodiment of the present invention the composition comprises a mixture of two or more anionic surfactants.

In an embodiment of the present invention the composition further comprises one or more other active ingredients.

In certain embodiments, there is provided stable compositions comprising glufosinate, an organosilicone adjuvant, a non-ionic surfactant and one or more other active ingredients.

In an embodiment, the composition comprises a second active ingredient. The second active ingredient may be a water soluble active ingredient or a water insoluble active ingredient.

In a preferred embodiment, the second active ingredient is an herbicide.

Examples of the second herbicide of present invention include diphenyl ethers, carbamates, thiocarbamates, haloacetanilides, phenoxycarboxylic acid derivatives, triazolinone herbicides, N-phenylphthalimide herbicides, heteroaryloxyphenoxy-alkanecarboxylic acid derivatives such as aryloxyphenoxy, quinolyloxy, quinoxalyloxy, pyridyloxy, benzoxalyloxy and benzothiazoleyloxy phenoxyalkanecarboxylic esters, cyclohexanedione derivatives, imidazolinones, pyrimidyloxypyridinecarboxylic acid derivatives, pyrimidyloxybenzoic acid derivatives, sulfonylureas, triazoleopyrimidinesulfonamide derivatives, and S—(N-aryl-N-alkylcarbamoylmethyl)dithiophosphoric esters.

In an embodiment of the present invention, the second herbicide is selected from acetochlor, alachlor, ametryn, amidosulfuron, amicarbazone, anilofos, atrazine, azafenidin, azimsulfuron, bencarbazone, benfluralin, benfuresate, bensulfuron-methyl, bensulide, benzfendizone, benzofenap, bromobutide, bromofenoxim, butachlor, butafenacil, butamifos, butralin, butylate, cafenstrole, carbetamide, carfentrazone, chlorbromuron, chloridazon, chlorimuron-ethyl, chlorotoluron, chlorpropham, chlorsulfuron, chlorthal-dimethyl, chlorthiamid, cinidon-ethyl, cinmethylin, cinosulfuron, clomazone, clomeprop, cloransulam-rnethyl, cyanazine, cycloate, cyclosulfamuron, daimuron, desmedipham, desmetryn, dichlobenil, diflufenican, dimefuron, dimepiperate, dirnethachlor, dimethametryn, dimethenamid, dinitramine, dinoterb, diphenamid, dithiopyr, diuron, EPTC, esprocarb, ethalfiuralin, ethametsulifuron-methyl, ethofumesate, ethoxysulfuron, etobenzanid, ferioxaprop-ethyl, fenuron, flamprop-methyl, flazasulfuron, fluazolate, flucarbazone, fluchloralin, flumetsulam, flumiclorac-pentyl, flumioxazin, fluometuron, fluorochloridone, flupoxam, flurenol, fluridone, fluroxypyr-1-methylheptyl, flurtamone, fluthiacet-methyl, chlorazifop, clodinafop, clofop, cyhalofop, diclofop, fenoxaprop fenoxaprop-P, fenthiaprop, fluazifop, fluazifop-P, haloxyfop, haloxyfop-P, haloxyfop-P methyl, imazamethabenz, imazamox, imazapic, imazapyr, imazaquin, imazethapyr, isoxapyrifop, kuicaoxi, metamifop, propaquizafop, quizalofop, quizalofop-P and trifop, halosulfuron, hexazinone, imazosulfuron, indanof an, ipfencarbazone, isoproturon, isouron, isoxaben, isoxaiflutole, lenacil, linuron, mefenacet, mesotrione, metamitron, metazachlor, methabenzthiazuron, methyldymron, metobenzuron, metobromuron, metolachlor, S-metolachlor, metosulam, metoxuron, metribuzin, metsulifuron, molinate, monolinuron, naproanilide, napropamide, neburon, nicosulfuron, norfiurazon, ethoxyfen, acifluorfen, aclonifen, bifenox, chlomethoxyfen, chlornitrofen, etnipromid, fluorodifen, fluoroglycofen fluoronitrofen, fomesafen, fucaomi, furyloxyfen, halosafen, lactofen, nitrofen, nitrofluorfen and oxyfluorfen, orbencarb, oryzalin, oxadiargyl, oxadiazon, oxasulfuron, pebulate, pendimethalin, pentanochlor, pentoxazone, phenmedipham, piperophos, pretilachlor, primisulfuron, prodiamine, profluazol, prometon, prometryn, propachlor, propanil, propazine, propham, propisochlor, propoxycarbazone, propyzamide, prosulfocarb, prosulfuron, pyraflufen-ethyl, pyrazogyl, pyrazolynate, pyrazosulfuron-ethyl, pyrazoxyfen, pyributicarb, pyridate, pyriminobac-methyl, quinclorac, quinmerac, rimsulfuron, siduron, simazine, simetryn, sulcotrione, sulfentrazone, sulfometuron, sulfosulfuron, tebutam, tebuthiuron, terbacil, terbumeton, terbuthylazine, terbutryn, thenyichlor, thiazopyr, thidiazimin, thifensulfuron, thiobencarb, thiencarbazone, tiocarbazil, triallate, triasulfuron, tribenuron, trietazine, trifluralin, triflusulfuron, terbuthylazine and vernolate.

In certain embodiments of the present invention the second herbicide is selected from diphenyl ether herbicides, chloroacetanilide herbicide or aryloxyphenoxypropionic acid herbicides, triazolineone herbicides and imidazolinone herbicides.

In certain preferred embodiments of the present invention the second herbicide is selected from diphenyl ether herbicides, chloroacetanilide herbicide or aryloxyphenoxypropionic acid herbicides.

With respect to the present invention, the term "diphenyl ether" embraces chemical compounds from the group of the diphenyl ether herbicides, their equivalents, metabolites, salts, esters and derivatives. Example of diphenyl ether herbicides include ethoxyfen, acifluorfen, aclonifen, bifenox, chlomethoxyfen, chlornitrofen, etnipromid, fluorodifen, fluoroglycofen fluoronitrofen, fomesafen, fucaomi, furyloxyfen, halosafen, lactofen, nitrofen, nitrofluorfen and oxyfluorfen. In certain embodiments of the present invention the composition comprises from about 0.1% to about 25% by weight of diphenyl ether herbicide. Preferably it is present in an amount from about 0.2% to about 15% by weight of the composition. In yet another embodiment of the present invention the diphenyl ether herbicide is oxyfluorfen.

Oxyfluorfen is a selective contact herbicide, absorbed more readily by the foliage (and especially the shoots) than by the roots, with very little translocation. It is used to control annual broad-leaved weeds and grasses in a variety of tropical and subtropical crops, by pre- or post-emergence. Particular crops include tree fruit, vines, nuts, cereals, maize, soya beans, peanuts, rice, cotton, bananas, peppermint, onions, garlic, ornamental trees and shrubs, and conifer seedbeds.

In an embodiment of the present invention the water insoluble herbicide is selected from chloroacetanilide herbicide. With respect to the present invention, the term "chloroacetanilide" refers to chemical compounds from the group of chloroacetanilide, their equivalents, metabolites, salts, esters, isomers and derivatives. Examples of chloroacetanilide herbicides include acetochlor, alachlor, butachlor, butenachlor, delachlor, diethatyl, dimethachlor, ethachlor, ethaprochlor, metazachlor, metolachlor, S-metolachlor, pretilachlor, propachlor, propisochlor, prynachlor, terbuchlor, thenylchlor, xylachlor.

In another embodiment of the present invention the composition comprises from about 1% to about 60% by weight of chloroacetanilide herbicide. Preferably it is present in an amount from about 5% to about 50% by weight of the composition. In certain embodiments of the present invention the chloroacetanilide herbicide is selected from metolachlor or S-metolachlor.

Metolachlor is a selective herbicide, absorbed predominantly by the hypocotyls and shoots. It inhibits germination and controls annual grasses and some broad-leaved weeds in maize, sorghum, cotton, sugar beet, fodder beet, sugar cane, potatoes, peanuts, soya beans, safflowers, sunflowers, various vegetables, fruit and nut trees, and woody ornamentals. It is usually applied pre-emergence, pre-plant incorporated or early post-emergence.

In certain embodiments of the present invention the water insoluble herbicides are selected from aryloxyphenoxypropionic acid herbicides. With respect to the present invention, the term "aryloxyphenoxypropionic acid" refers to chemical compounds from the group of aryloxyphenoxypropionic acid, their equivalents, metabolites, salts, esters, isomers and derivatives. Examples of aryloxyphenoxy propionic acid herbicides include chlorazifop, clodinafop, clofop, cyhalofop, diclofop, fenoxaprop fenoxaprop-P, fenthiaprop, fluazifop, fluazifop-P, haloxyfop, haloxyfop-P, haloxyfop-P methyl, isoxapyrifop, kuicaoxi, metamifop, propaquizafop, quizalofop, quizalofop-P and trifop.

In another embodiment of the present invention the composition comprises from about 0.1% to about 25% by weight of aryloxyphenoxypropionic acid. Preferably it is present in an amount from about 0.15% to about 15% by weight of the composition.

In certain embodiment of the present invention the aryloxyphenoxypropionic acid herbicides are selected from haloxyfop, and its isomers or its derivatives such as esters.

In another embodiment of the present invention the aryloxyphenoxypropionic acid herbicides is haloxyfop-P methyl.

Haloxyfop is a fatty acid synthesis inhibitor, acts by inhibition of acetyl CoA carboxylase (ACCase). Haloxyfop-esters are selective herbicides, absorbed by the foliage and roots, and hydrolysed to haloxyfop, which is translocated to meristematic tissues, and inhibits their growth. They are usually used post-emergence for control of annual and perennial grasses in sugar beet, fodder beet, oilseed rape, potatoes, leafy vegetables, onions, flax, sunflowers, soya beans, vines, strawberries and other crops.

In certain embodiments of the present invention the herbicides are selected from triazolineone herbicides. With respect to the present invention, the term "triazolineone" refers to chemical compounds from the group of triazolineone, their equivalents, metabolites, salts, esters, isomers and derivatives. Examples of triazolinone herbicides are selected from amicarbazone, bencarbazone, carfentrazone, flucarbazone, ipfencarbazone, propoxycarbazone, sulfetrazone and thiencarbazone.

In another embodiment of the present invention the composition comprises from about 0.1% to about 25% by weight of triazolineone herbicides. Preferably it is present in an amount from about 0.15% to about 15% by weight of the composition.

In certain embodiments of the present invention the herbicides are selected from imidazolinone herbicides. With respect to the present invention, the term "imidazolinone" refers to chemical compounds from the group of imidazolinone, their equivalents, metabolites, salts, esters, isomers and derivatives. Examples of imidazolinone herbicides are selected from imazamethabenz, imazamox, imazapic, imazapyr, imazaquin and imazethapyr.

In another embodiment of the present invention the composition comprises from about 0.1% to about 25% by weight of imidazolinone herbicides. Preferably it is present in an amount from about 0.15% to about 15% by weight of the composition. In another embodiment of the present invention the composition further comprises at least two active ingredients.

In an embodiment, the composition comprises two other herbicides along with glufosinate.

In another embodiment, the present invention provides a composition comprising glufosinate, an organosilicone adjuvant, a non-ionic surfactant and at least two other active ingredients preferably herbicides.

In certain embodiments of the present invention, other herbicides are selected from diphenyl ether herbicides, chloroacetanilide herbicide or aryloxyphenoxypropionic acid herbicides, triazolineone herbicides and imidazolinone herbicides.

In certain embodiments of the present invention there is provided a composition comprising glufosinate, an organosilicone adjuvant, a non-ionic surfactant and at least two herbicides selected from diphenyl ether herbicides, chloroacetanilide herbicide, aryloxyphenoxypropionic acid herbicides, triazolineone herbicides or imidazolinone herbicides.

In certain embodiments of the present invention the composition comprises at least one organic solvent.

With respect to the present invention the term "organic solvent" refers to polar or nonpolar organic solvents. Examples of solvents are aliphatic or aromatic hydrocarbons for example Aromatic C-9, Solvent naphtha, Solvesso100, Solvesso150 and Solvesso 200, their derivatives, halogenated aliphatic or aromatic hydrocarbons, ethers, alkylene glycols, alkyleneglycol monoalkyl ethers such as propylene glycol monomethyl ether, Spicosolve and dialkyl ethers, amides such as Rhodiasolv ADMA 10, ADMA 810, ketones for example cyclohexanone or isophorone, glycerol and glycerol esters such as glycerol triacetate, N-methylpyrrolidone, nitriles and sulfoxides and mixtures thereof.

In yet another embodiment the solvents are selected from oils of vegetable or animal origin or their derivatives. Examples of oils include soyabean oil, epoxidized soybean oil, linseed oil, rapeseed oil, canola oil, olive oil or sunflower oil, emulsified vegetable oil, corn oil, its concentrates and lower alkyl derivatives thereof.

The compositions according to the present invention may optionally include adjuvants/auxiliary agents commonly used in agricultural treatment formulations and known to those skilled in the art. Examples include surfactants, solvent, fertilizer, pH modifiers, crystallization inhibitors, viscosity modifiers, suspending agents, spray droplet modifiers, pigments, antioxidants, foaming agents, light-blocking agents, compatibilizing agents, antifoam agents, sequestering agents, neutralizing agents, corrosion inhibitors, dyes, odorants, spreading agents, penetration aids, micronutrients, emollients, lubricants, sticking agents, dispersing agents, wetting agent, thickening agents, freezing point depressants, antimicrobial agents, and the like.

In an embodiment of the present invention there is provided a stable composition comprising glufosinate ammonium, organosilicone adjuvant and a nonionic surfactant.

Accordingly the composition comprises from about 1% to about 80% by weight of glufosinate ammonium, from about 0.1% to about 5% by weight of organosilicone adjuvant and from about 0.1% to about 10% by weight of nonionic surfactant.

In another embodiment of the present invention there is provided a stable composition comprising glufosinate ammonium, organosilicone adjuvant, a nonionic surfactant and an anionic surfactant.

Accordingly the composition comprises from about 1% to about 80% by weight of glufosinate ammonium, from about 0.1% to about 5% by weight of organosilicone adjuvant, from about 0.1% to about 10% by weight of nonionic surfactant and from about 0.1% to about 15% by weight of anionic surfactant.

In an embodiment of the present invention there is provided a stable oil-in-water emulsion composition comprising glufosinate ammonium, oxyfluorfen, organosilicone adjuvant and a nonionic surfactant.

Accordingly the composition comprises from about 1% to about 30% by weight of glufosinate ammonium, from about 0.1% to about 15% by weight of oxyfluorfen, from about 0.1% to about 5% by weight of organosilicone adjuvant and from about 0.1% to about 10% by weight of nonionic surfactant.

In an embodiment of the present invention there is provided a stable oil-in-water emulsion composition comprising glufosinate ammonium, oxyfluorfen, organosilicone adjuvant, a nonionic surfactant and an anionic surfactant.

Accordingly the composition comprises from about 1% to about 30% by weight of glufosinate ammonium, from about 0.1% to about 20% by weight of oxyfluorfen, from about 0.1% to about 5% by weight of organosilicone adjuvant, from about 0.1% to about 10% by weight of nonionic surfactant and from about 0.1% to about 20% by weight of an anionic surfactant.

In another embodiment of the present invention there is provided a stable oil-in-water emulsion composition comprising glufosinate ammonium, S-metolachlor, organosilicone adjuvant and a nonionic surfactant. Further the composition comprises an anionic surfactant.

Accordingly the composition comprises from about 1% to about 30% by weight of glufosinate ammonium, from about 1% to about 60% by weight of S-metolachlor, from about 0.1% to about 5% by weight of organosilicone adjuvant, from about 0.1% to about 10% by weight of nonionic surfactant and from about 0.1% to about 20% by weight of an anionic surfactant.

In yet another embodiment of the present invention there is provided a stable oil-in-water emulsion composition comprising glufosinate ammonium, haloxyfop-P methyl, organosilicone adjuvant and a nonionic surfactant. Further the composition comprises an anionic surfactant.

Accordingly the composition comprises from about 1% to about 30% by weight of glufosinate ammonium, from about 0.1% to about 20% by weight of haloxyfop-P methyl, from about 0.1% to about 5% by weight of organosilicone adjuvant, from about 0.1% to about 10% by weight of nonionic surfactant and from about 0.1% to about 20% by weight of an anionic surfactant.

In yet another embodiment of the present invention there is provided a stable oil-in-water emulsion composition comprising glufosinate ammonium, haloxyfop-P methyl, carfentrazone ethyl, organosilicone adjuvant and a nonionic surfactant. Further the composition comprises an anionic surfactant.

Accordingly the composition comprises from about 1% to about 30% by weight of glufosinate ammonium, from about 0.1% to about 20% by weight of haloxyfop-P methyl, from about 0.1% to about 20% by weight of carfentrazone ethyl, from about 0.1% to about 5% by weight of organosilicone adjuvant, from about 0.1% to about 10% by weight of nonionic surfactant and from about 0.1% to about 20% by weight of an anionic surfactant.

In an embodiment of the present invention there is provided a process for the preparation of stable composition comprising glufosinate, an organosilicone adjuvant and a non-ionic surfactant.

Further there is provided a process for the preparation of stable composition comprising glufosinate, an organosilicone adjuvant, a non-ionic surfactant and a second active ingredient.

In a preferred embodiment of the present invention there is provided a process for preparing a stable emulsion composition comprising glufosinate ammonium, an organosilicone adjuvant, a non-ionic surfactant and a second herbicide.

In another embodiment there is provided a process for making stable oil-in-water emulsion composition comprising glufosinate ammonium, one or more herbicides, an organosilicone adjuvant and a non-ionic surfactant, said process comprises the steps of:
a) adding required quantity of glufosinate ammonium into mixing vessel-1 and dissolving it in required quantity of water;
b) adding required quantity of one or more herbicides into mixing vessel-2 and dissolving it in required quantity of solvent;
c) adding required quantity of organosilicone adjuvant and nonionic surfactant into the vessel-2 and mixing well to get the oil phase;
d) adding other customary adjuvants if required; and
e) adding oil phase (vessel-2) into the aqueous phase (vessel-1) with continuous stirring to get stable oil-in-water emulsion.

According to another embodiment, there is provided a process for making stable oil-in-water emulsion composition comprising glufosinate ammonium, one or more water insoluble herbicides, an organosilicone adjuvant and a non-ionic surfactant and said process comprises the steps of:
a) adding required quantity of glufosinate ammonium into mixing vessel-1 and dissolving it in required quantity of water with stirrer until it dissolves;
b) adding required quantity of one or more water insoluble herbicides into mixing vessel-2 and dissolving it in required quantity of solvent until it dissolves;
c) adding required quantity of organosilicone adjuvant and nonionic surfactant into the vessel-2 and mixing well to get the oil phase;
d) adding other customary adjuvants if required; and
e) adding oil phase (vessel-2) into the aqueous phase (vessel-1) with continuous stirring to get stable oil-in-water emulsion.

In an embodiment, there is provided a method to control undesired plants or to influence the growth of plants, said method comprising applying to the plants or to their locus an effective amount of the composition according to the present invention comprising glufosinate, an organosilicone adjuvant and a non-ionic surfactant.

In another embodiment, there is provided a method of weed control comprising applying to the plants, a composition according to the present invention comprising glufosinate, an organosilicone adjuvant, a non-ionic surfactant and one or more other herbicides The compositions of the present invention can be used to selectively control annual and perennial harmful plants in tree, nut and vine crops as well as in plantation crops such as coconut, coffee, cocoa and tea as well as in fruit production.

In a preferred embodiment of the present invention, there is provided a method to control harmful plants in tea plantations wherein said method comprises applying to the plants or to their locus an effective amount of the composition comprising glufosinate, an organosilicone adjuvant, a non-ionic surfactant and one or more other active ingredients.

Inventors of the present invention succeeded in preparing advantageously stable compositions comprising glufosinate, an organosilicone adjuvant, a non-ionic surfactant and optionally one or more other herbicides. The compositions according to the present invention are found to be stable at various temperature conditions as well as effective for their intended biological activity.

The instant invention is more specifically explained by below examples. However, it should be understood that the scope of the present invention is not limited by the examples in any manner. It will be appreciated by any person skilled in this art that the present invention includes aforesaid examples and further can be modified and altered within the technical scope of the present invention.

EXAMPLES

The following examples demonstrate the preparation of stable emulsion compositions in accordance with the present invention.

Example 1: An Oil-In-Water Emulsion Composition of Glufosinate Ammonium and Oxyfluorfen was Prepared as Follows

| Ingredients | Amount (% w/w) |
| --- | --- |
| Glufosinate ammonium | 13.5 |
| Oxyfluorfen | 5.0 |
| Rhodiasolv ADMA 10 | 20 |
| Solvent naphtha | 5 |
| Silwet L408 | 0.75 |
| ADSEE 900 | 1.7 |
| Soprophore 4D384 | 2.8 |
| Water | Q.S. |

The composition was prepared by the following manner:
Required quantity of glufosinate ammonium was taken in vessel 1 and dissolved in water completely. In vessel 2, required quantity of oxyfluorfen was taken and was dissolved using solvent naphtha and Rhodiasolv Adma-10. Required quantity of Silwet L408, ADSEE 900 and Soprophore 4D384 were added to vessel 2 and mixed well to get the oil phase. The oil phase was mixed with the aqueous phase slowly to get a stable emulsion.

Example 2: An Oil-In-Water Emulsion Composition of Glufosinate Ammonium and S-Metolachlor

| Ingredients | Amount (% w/w) |
| --- | --- |
| Glufosinate ammonium | 27.6 |
| S-Metolachlor | 11.8 |
| Solvent naphtha | 12 |
| Propylene Glycol | 0.5 |
| Dow corning 5212 | 0.5 |
| Tergitol 15-S-7 | 1.5 |
| Soprophore FL | 13.3 |
| Water | Q.S. |

Example 3: An Oil-In-Water Emulsion Composition of Glufosinate Ammonium and S-Metolachlor

| Ingredients | Amount (% w/w) |
| --- | --- |
| Glufosinate ammonium | 27.6 |
| S-Metolachlor | 11.8 |

-continued

| Ingredients | Amount (% w/w) |
|---|---|
| Solvent naphtha | 12 |
| Propylene Glycol | 0.5 |
| Aerosil R816 | 2.0 |
| Tergitol 15-S-7 | 1.5 |
| Soprophore FL | 13.3 |
| Water | Q.S. |

Example 4: An Oil-In-Water Emulsion Composition of Glufosinate Ammonium and Haloxyfop-P Methyl

| Ingredients | Amount (% w/w) |
|---|---|
| Glufosinate ammonium | 16.0 |
| Haloxy fop P-methyl | 4.0 |
| Solvent naphtha | 25 |
| Glycerol | 0.5 |
| Qwikwet 357 | 0.5 |
| Tergitol 15-5-7 | 0.5 |
| Synperonic A-11 | 3.5 |
| Water | Q.S. |

Example 5: An Oil-In-Water Emulsion Composition of Glufosinate Ammonium

| Ingredients | Amount (% w/w) |
|---|---|
| Glufosinate ammonium | 13.5 |
| Soyabean oil methyl ester | 20 |
| Aromatic C-9 | 5 |
| Silgourd 9 | 2.0 |
| Tergitol XD | 1.7 |
| Stepfac TSP PE-N | 2.8 |
| Water | Q.S. |

Example 6: An Oil-In-Water Emulsion Composition of Glufosinate Ammonium, Haloxyfop-P Methyl and Carfentrazone Ethyl

| Ingredients | Amount (% w/w) |
|---|---|
| Glufosinate ammonium | 32.0 |
| Haloxyfop P-methyl | 1.20 |
| Carfentrazone ethyl | 2.50 |
| Solvent naphtha | 25.0 |

-continued

| Ingredients | Amount (% w/w) |
|---|---|
| Qwikwet 357 | 0.5 |
| Tergitol 15-5-7 | 0.5 |
| Synperonic A-11 | 3.5 |
| Water | Q.S. |

Storage Stability of the Compositions:

The stability of the compositions according to the present invention was tested as per CIPAC Methods 36.3. The following examples in Table 1 illustrate the compositions prepared in accordance with the present invention (samples 1-18) and Table 2 provides the observations on storing the said compositions at temperatures up to −5° C. (CIPAC MT 46.3 and MT 39.3). The compositions were further tested for their stability by observing the appearance of the oil-in water emulsions upon dilution (as per CIPAC MT 36.3) and the results are summarized in Table 3.

TABLE 1

Oil-in-water emulsions according to the present invention

| Composition | Active ingredient | (% by wt.) | Polyalkylene oxide modified trisiloxane (% by wt.) | Nonionic surfactant (% by wt.) | Anionic surfactant (% by wt.) |
|---|---|---|---|---|---|
| Sample 1 | A | 13.5 | 2 | 1.7$^F$ | 2.8$^I$ |
| Sample 2 | A + B | 13.5 + 5 | — | 1.7$^F$ | — |
| Sample 3 | A + B | 13.5 + 5 | 2 | 1.7$^F$ | — |
| Sample 4 | A + B | 13.5 + 5 | 5 | 1.7$^F$ | — |
| Sample 5 | A + B | 13.5 + 5 | 5 | — | — |
| Sample 6 | A + B | 13.5 + 5 | 5 | — | 2.8$^I$ |
| Sample 7 | A + B | 13.5 + 5 | 0.75 | 1.7$^F$ | 2.8$^I$ |
| Sample 8 | A + B | 13.5 + 5 | 0.75 | 1.9$^F$ | — |
| Sample 9 | A + C | 11.8 + 27.6 | 1.5 | 2.2$^G$ | — |
| Sample 10 | A + C | 11.8 + 27.6 | 1.5 | 1.15$^G$ | — |
| Sample 11 | A + C | 11.8 + 27.6 | 1.5 | 1.2$^G$ | — |
| Sample 12 | A + C | 6.5 + 32.1 | 1.5 | 1.05$^E$ | — |
| Sample 13 | A + C | 11.8 + 27.6 | 1.5 | 1.3$^E$ | — |
| Sample 14 | A + C | 11.8 + 27.6 | 0.5 | 1.5$^E$ | 13.3$^J$ |
| Sample 15 | A + C | 11.8 + 27.6 | 0.5 | — | 11.0$^J$ |
| Sample 16 | A + D | 16 + 4 | 0.5 | 0.5$^F$ + 3.5$^H$ | 3$^J$ |
| Sample 17 | A + D | 16 + 4 | 0.5 | 1.5$^F$ | 2.5 |
| Sample 18 | A + D | 16 + 4 | 0.5 | — | 2.5$^J$ |

A = Glufosinate ammonium;
B = Oxyfluorfen;
C = S-metolachlor;
D = Haloxyfop p-methyl
$^E$Polyethylene glycol esters of fatty acids;
$^F$Polyalkylene glycol monobutyl ether;
$^G$Isotridecanol ethoxylate;
$^H$Tristyrylphenol ethoxylate;
$^I$Tristyrylphenol ether phosphate;
$^J$Tristyrylphenol ether sulfate

TABLE 2

Stability of oil-in-water emulsions

| Composition | Appearance at 25° C. after 14 days | Appearance at 54 ± 2° C. after 14 days | Appearance at 0° C. after 7 days | Appearance at −5° C. after 7 days |
|---|---|---|---|---|
| Sample 1-4 | Milky emulsion | Milky emulsion | Milky emulsion | Flowable Milky emulsion |
| Sample 5 | Milky emulsion | Phase separation | — | — |
| Sample 6 | Milky emulsion | Milky emulsion | Phase separation | — |
| Sample 7-14 | Milky emulsion | Milky emulsion | Milky emulsion | Flowable Milky emulsion |
| Sample 15 | Milky emulsion | Milky emulsion | Phase separation | — |

TABLE 2-continued

Stability of oil-in-water emulsions

| Composition | Appearance at 25° C. after 14 days | Appearance at 54 ± 2° C. after 14 days | Appearance at 0° C. after 7 days | Appearance at −5° C. after 7 days |
|---|---|---|---|---|
| Sample 16-17 | Milky emulsion | Milky emulsion | Milky emulsion | Flowable Milky emulsion |
| Sample 18 | Milky emulsion | Milky emulsion | Phase separation | — |

It has been observed that the compositions according to the present invention led to stable emulsions. Composition of glufosinate ammonium with polyalkylene oxide modified trisiloxane and polyalkylene glycol monobutyl ether led to a stable formulation. Composition of glufosinate ammonium, oxyfluorfen, polyalkylene oxide modified trisiloxane and a nonionic surfactant (Samples 3-4 and samples 6-7) was found to be stable and no creaming or layer separation was observed at −5° C. Sample 5, a composition containing glufosinate ammonium, oxyfluorfen with polyalkylene oxide modified trisiloxane, but without a non-ionic surfactant, resulted in phase separation. Further, composition of glufosinate ammonium, oxyfluorfen with polyalkylene oxide modified trisiloxane (Sample 6) which do not contain a non-ionic surfactant lead to phase separation at 0° C. and thereby an unstable emulsion. Stable emulsions comprising glufosinate, S-metolachlor, with polyalkylene oxide modified trisiloxane and different nonionic surfactants were prepared as exemplified in samples 9-14. It has been further observed that in the case of sample 15 where the composition was prepared in the absence of a nonionic surfactant the composition failed to give a stable emulsion; phase separation was observed at 0° C. Oil-in-water emulsions of glufosinate and haloxyfop p-methyl prepared according to the present invention (sample 16-17) were found to be stable. However sample 18 comprising glufosinate, haloxyfop p-methyl, organosilicone adjuvant and an anionic surfactant (which replaced the non-ionic surfactant) led to phase separation at 0° C.

TABLE 3

Emulsion stability on dilution with water
Stability of samples of table 1 were observed after dilution with water.

| Composition | Cream formation after 24 hrs (ml) | Sedimentation after 24 hrs | Observation |
|---|---|---|---|
| Sample 2 | 2 | 0.1 | stable |
| Sample 3 | 1 | 0.1 | stable |
| Sample 4 | Nil | 0.3 | stable |
| Sample 7 | Nil | 0.4 | stable |
| Sample 8 | >2 ml | 0.1 | stable |
| Sample 9 | Nil | 0.6 | stable |
| Sample 10-12 | Nil | Nil | stable |
| Sample 13-14 | Nil | 0.2 | stable |
| Sample 16-17 | Nil | Nil | stable |

The stability of the composition were further confirmed by observing them after dilution with water. The sample were checked for the stability parameters such as creaming and sedimentation. All the compositions prepared according to the present invention were found to be stable without any creaming or sedimentation.

Field Trial:

Field trials were carried out using the compositions comprising glufosinate ammonium and oxyfluorfen prepared according to the present invention. The compositions were diluted with water at the rate of 200-500 lit/ha and optionally with other tank mix auxiliaries and applied to crop and non-crop land containing many broad leave weeds, grasses and sedges.

TABLE 4

Percent weed control at 3 days after application (3 DAA)

| | Percent Weed control Dosage: 840 g of Glufosinate ammonium/ha + 300 g of oxyfluorfen/ha | |
|---|---|---|
| Composition | Weed Species: perthenium spp. 3 DAA | Weed Species: Amaranthus spp. 3 DAA |
| Sample 2 | 30 | 41.7 |
| Sample 4 | 48.3 | 55.0 |

TABLE 5

Percent weed control at 7 days after application (7 DAA)

| | Percent Weed control Dosage: 840 g of Glufosinate ammonium/ha + 300 g of oxyfluorfen/ha | |
|---|---|---|
| Composition | Weed Species: perthenium spp. 7 DAA | Weed Species: Amaranthus spp. 7 DAA |
| Sample 2 | 60 | 71.9 |
| Sample 4 | 78 | 93.3 |

Field trials were conducted to determine the bio efficacy of compositions comprising glufosinate and a water insoluble active ingredient, an organosilicone adjuvant and a non-ionic surfactant (sample 4). Table 4 and 5 demonstrates that overall, the composition according to the present invention is bio efficacious. The activity of the compositions are more pronounced in sample 4 than in composition employed in the absence of organosilicone adjuvant though it led to a stable composition (sample 2), which signifies the role of organosilicone adjuvant in bio efficacy.

A particular advantage of the present invention is the rapid onset of the herbicidal action. Inventors of the present invention observed a spiking in the herbicidal activity of glufosinate. As early as 3 days after application faster symptoms such as yellowing and desiccation of the leaves of the treated weeds were observed which led to unexpected rapid herbicidal activity and assessable weed control. These compositions further demonstrated that the combination of an organosilicone adjuvant and a non-ionic surfactant with glufosinate and a water insoluble active ingredient were favorable in their ability to provide very effective and prolonged weed control.

The invention claimed is:

1. A composition comprising a water soluble salt of glufosinate, an organosilicone adjuvant and a non-ionic surfactant, wherein said non-ionic surfactant is selected from the group consisting of a polyethylene glycol ester of a fatty acid, a polyalkylene glycol monobutyl ether, a tristyryl phenol alkoxylate, and a $C_1$-$C_{25}$ alcohol alkoxylate, wherein said composition does not include a suspending agent, and wherein said composition is an oil-in water emulsion, wherein the composition does not exhibit creaming or phase separation after storage at 54±2° C. for 14 days and at 0° C. or −5° C. for 7 days.

2. The composition of claim 1, wherein said water soluble salt is glufosinate ammonium or glufosinate-P.

3. The composition of claim 1, wherein said organosilicone adjuvant is an organomodified siloxane selected from the group consisting of alkyl-modified trisiloxanes, alkoxylated trisiloxanes, and polyalkyleneoxide-modified trisiloxanes.

4. The composition of claim 1, wherein said composition further comprises an anionic surfactant.

5. The composition of claim 4, wherein said anionic surfactant is selected from the group consisting of ether carboxylate of a fatty alcohol having 10-24 carbon atoms, a sulphonate of a fatty alcohol having 10-24 carbon atoms, a sulfate of a fatty alcohol having 10-24 carbon atoms, a phosphate of a fatty alcohol having 10-24 carbon atoms, a salt of a tristrylphenol ether phosphate, a salt of a tristrylphenol ether sulfate, a linear alkyl benzene sulphonate, and an alkyl sulfosuccinate.

6. The composition as claimed in claim 1, wherein said composition comprises from 1% to 60% by weight of glufosinate, 0.1% to 5% by weight of the organosilicone adjuvant, and 0.1% to 25% by weight of the nonionic surfactant, wherein all weights are based on the total weight of the composition.

7. A method of weed control, said method comprising applying to plants or to their locus an effective amount of the composition of claim 1.

8. A composition comprising a water soluble salt of glufosinate, an organosilicone adjuvant, a non-ionic surfactant, and one or more additional active ingredients wherein said non-ionic surfactant is selected from the group consisting of a polyethylene glycol ester of a fatty acid, a polyalkylene glycol monobutyl ether, a tristyryl phenol alkoxylate, and a $C_1$-$C_{25}$ alcohol alkoxylate;

wherein said composition does not include a suspending agent; and wherein said composition is an oil-in water emulsion, wherein the composition does not exhibit creaming or phase separation after storage at 54±2° C. for 14 days and at 0° C. or −5° C. for 7 days.

9. The composition of claim 8, wherein said additional active ingredient is an herbicide.

10. The composition of claim 9, wherein said herbicide is selected from the group consisting of diphenyl ethers, carbamates, thiocarbamates, haloacetanilides, phenoxycarboxylic acid herbicides, triazolinone herbicides, N-phenylphthalimi de herbicides, aryloxyphenoxy herbicides, quinolyloxy herbicides, quinoxalyloxy herbicides, pyridyloxy herbicides, benzoxalyloxy herbicides, benzothiazoleyloxyphenoxyalkanecarboxylic ester herbicides, cyclohexanedione herbicides, imidazolinones, pyrimidyloxypyridinecarboxylic acid herbicides, pyrimidyloxybenzoic acid herbicides, sulfonylureas, triazoleopyrimidinesulfonamide herbicides, and S—(N-aryl-N-alkylcarbamoylmethyl)dithiophosphoric esters.

11. A method of weed control said method comprising applying to plants or to their locus an effective amount of the composition of claim 8.

12. A composition comprising a water soluble salt of glufosinate, an organosilicone adjuvant, a non-ionic surfactant and an additional herbicide selected from oxyfluorfen, S-metolachlor, haloxyfop and clodinafop, wherein said non-ionic surfactant is selected from the group consisting of a polyethylene glycol ester of a fatty acid, a polyalkylene glycol monobutyl ether, a tristyryl phenol alkoxylate, and a $C_1$-$C_{25}$ alcohol alkoxylate;

wherein said composition does not include a suspending agent; and wherein said composition is an oil-in water emulsion, wherein the composition does not exhibit creaming or phase separation after storage at 54±2° C. for 14 days and at 0° C. or −5° C. for 7 days.

\* \* \* \* \*